Figure 1:
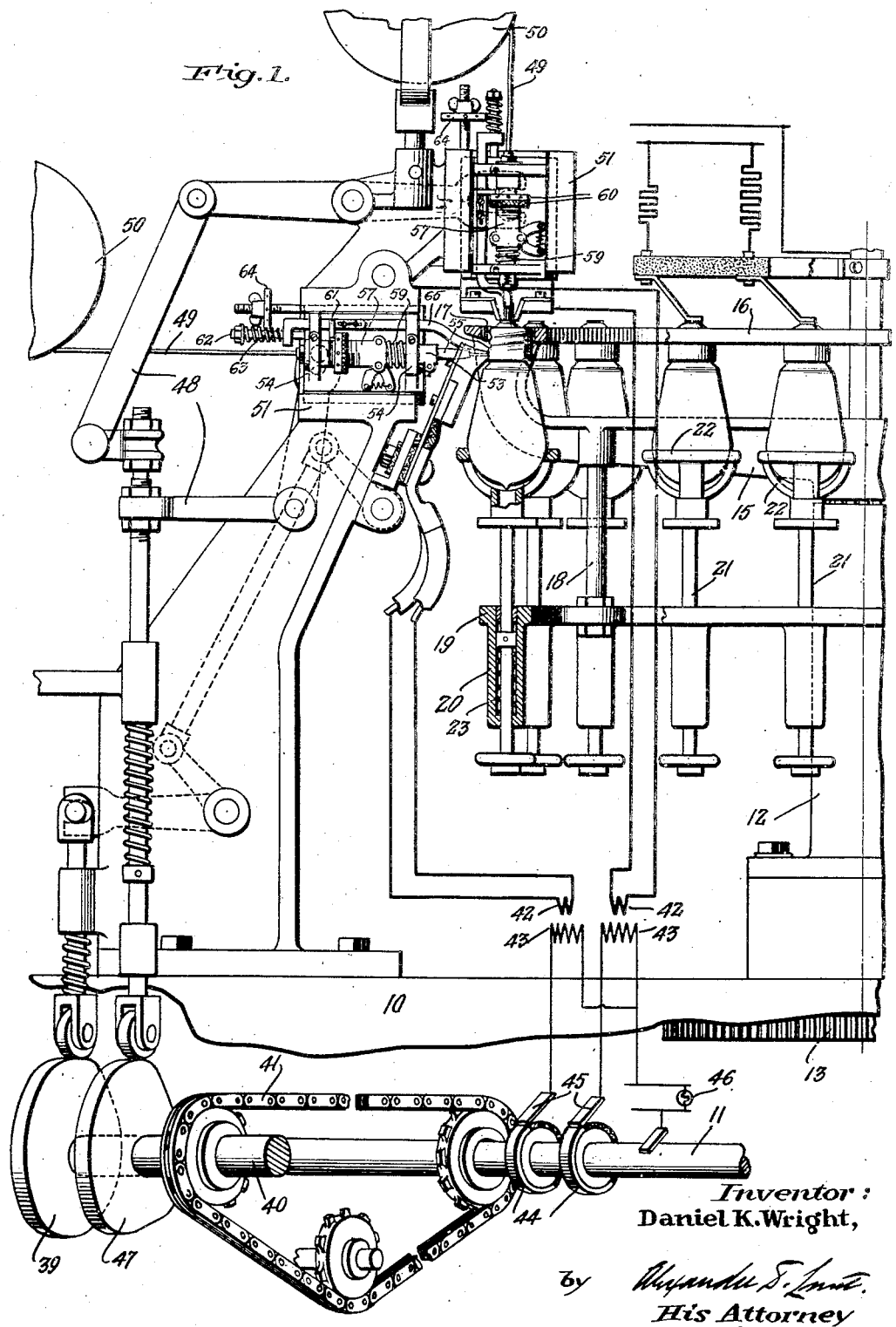

March 4, 1930.  D. K. WRIGHT  1,749,684
ELECTRIC SOLDERING MACHINE
Original Filed March 28, 1925  2 Sheets-Sheet 1

Inventor:
Daniel K. Wright,
by Alexander S. [illegible]
His Attorney

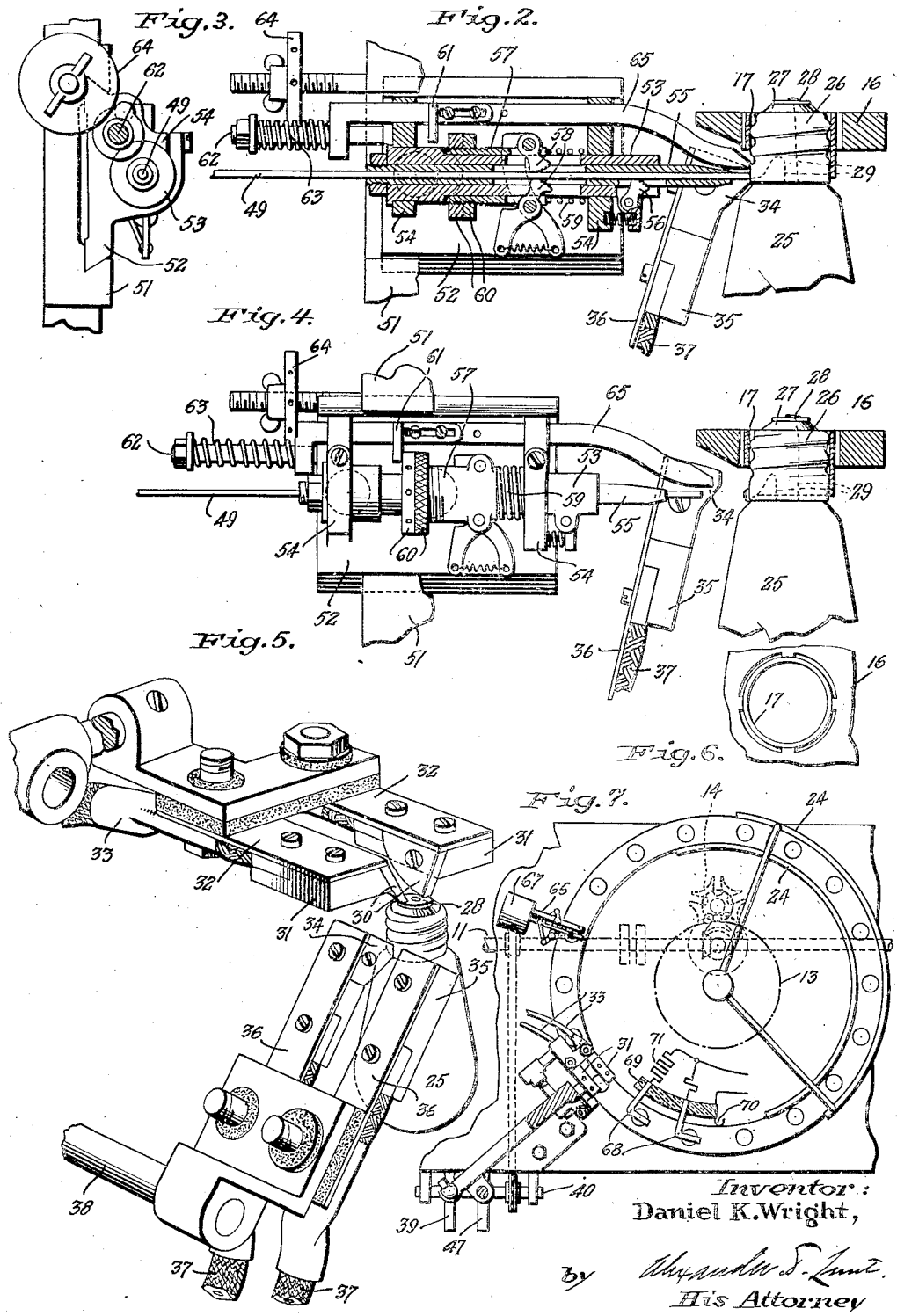

Patented Mar. 4, 1930

1,749,684

UNITED STATES PATENT OFFICE

DANIEL K. WRIGHT, OF PATERSON, NEW JERSEY, ASSIGNOR TO GENERAL ELECTRIC COMPANY, A CORPORATION OF NEW YORK

ELECTRIC SOLDERING MACHINE

Application filed March 28, 1925, Serial No. 19,129. Renewed August 21, 1929.

My invention relates to soldering and to supplying solder at specified points on metal surfaces, and more particularly to making soldered joints between a sheet of metal and a wire or similar object to be attached to the metal. It is particularly useful in soldering the lead wires of incandescent lamps to the metal parts of the lamp bases, but is useful for many other kinds of soldering.

In the manufacture of incandescent lamps the lead wires which conduct current to the lamp must be firmly soldered to the metal contacts which form part of the base of the lamp. Heretofore, this soldering has been done by hand in order to keep the lump of solder where the wire is joined to the contact as small as possible. The automatic soldering devices commonly used for soldering tin cans and similar articles are not suitable for soldering lead wires to the bases of incandescent lamps as they apply too much solder, discolor the base with flux, and in general, operate in a manner and at a temperature which causes tarnishing and discoloration of the metal parts of the lamp base.

A further difficulty encountered in soldering wires to lamp bases in the usual manner is that the solder is melted by applying a hot soldering iron to the cold metal surface to which the wire or other object is to be soldered. A good joint is not made between the solder and metal until the metal reaches a definite and rather high temperature. As the metal is heated by conduction from the hot soldering iron it is necessary, if the soldering operation is to be performed properly in a short space of time, to heat the soldering iron so hot that there is grave danger of overheating the solder and of tarnishing the metal. With a very hot iron the solder is heated so much above its melting point that it has a tendency to run over the surface of the metal and thereby spread to places where it is not wanted. The soldering irons are usually heated by gas flames which are objectionable on account of the difficulty encountered in maintaining the irons at just the proper temperature, particularly if the operation of the machine is interrupted for a short time for then the idle soldering irons become very much hotter than is desirable.

One object of my invention is to provide a simple and reliable soldering device for soldering wire or other objects to a sheet of metal without the use of a soldering iron and with a minimum amount of solder which is applied only at the point of contact between the two objects to be soldered together. A further object of my invention is to eliminate the use of gas for supplying the necessary heat for the soldering operation. Another object is to provide an apparatus which will automatically apply the minimum amount of solder necessary to perform the soldering operation and will restrict it to the precise point where the solder should be placed. Still another object is to improve the quality of the soldering by bringing the metal plate or surface to the proper temperature without applying a heated soldering iron to it.

In accordance with my invention the metal contact or plate to which the solder is to be applied is heated to the proper temperature by passing through it electric current of sufficient intensity to heat the metal or plate because of its resistance to the flow of current. In this way a very accurate control of the temperature of the metal is obtained. After the plate is heated to the proper temperature the solder, which may conveniently be in the form of a wire, is brought in contact with the heated plate at the precise point where the soldering is to be done, and the solder is melted by the heat of the plate. By controlling the movement of the solder wire the amount of solder melted from the end of the wire and applied to the plate can be controlled very accurately. The heating of the plate is strictly localized at the point where the soldering is to be done by providing electrodes spaced apart and so mounted that they automatically engage the contact or metal plate at points on opposite sides of the spot where the solder is to be applied, whereupon the current between the electrodes heats up only that portion of the metal plate or contact between those electrodes, while the rest of the plate remains comparatively cool. The solder in the form of a wire is fed automatically to bring its end into contact with the heated portion of the plate, whereupon enough solder melts off the end of the wire to make very good joint with the metal. The electrodes can be applied to the metal plate by moving them to and from the plate, or by mounting them resiliently, and then automatically sliding the plate under them, so that the electrodes will be on the metal plate, and then stopping the plate with the portion to which the solder is to be applied between the electrodes. This method of soldering is particularly useful where solder is to be applied to vertical surfaces, such as the side of a base of an incandescent lamp, as the difficulty due to the solder running off the soldering iron is eliminated.

My invention will best be understood in connection with the accompanying drawings, in which merely for purposes of illustration, I have shown one form in which my invention may be embodied and in which Figure 1 is a side view, with certain parts in section, of a soldering machine for incandescent lamps; Figure 2 is a longitudinal section through the solder wire feeding mechanism along the solder wire; Fig. 3 is an end view of the mechanism shown in Fig. 4 with the parts in a different position; Figure 5 is a view showing how the contacts engage the base of the lamp, and Fig. 6 is a top plan view of the machine shown in Fig. 1.

The particular soldering machine illustrated in the drawings comprises a table 10 having underneath the top a drive shaft 11 for actuating the various parts of the machine. On the top of the table there is a vertical pedestal 12 containing a vertical shaft driven step by step from the lower end through a gear 13 which in turn, as indicated in Fig. 6, is driven by intermittent gearing 14. On the upper end of the pedestal 12 and connected to the shaft in the pedestal so as to be driven step by step is a spider 15 which carries on the ends of its arms a basing ring 16 provided with a plurality of basing sockets 17, best shown in Figs. 2 and 4, and which also carries by means of rods 18 secured to its arms a guide ring 19 having tubular bosses 20. The lamps are held with their bases in the sockets 17 by resilient holders, such as spring pressed rods 21 slidably mounted in the bosses 20 and each provided near its upper end with a bulb cup 22. The rods 21 are urged toward the sockets 17 by coil springs 23 mounted in the bosses 19, as shown in Figure 1, to cause the bulb holders to engage the bulb of the lamp and hold the lamp with its base in the basing socket 17.

To bake the basing cement and thereby fasten the bases to the glass bulbs of the lamps the basing sockets 17 are heated, preferably by burners 24 in the form of curved tubes concentric with the ring 16 and mounted, as best shown in Figure 6, on opposite sides of the ring 16 and provided on their inner sides with holes which direct the flames upon the basing sockets 17 during about one third of the travel of those sockets. In this way the basing sockets are heated to the extent necessary to bake and set the basing cement.

The incandescent lamp 25 held in the bulb cup 22 is provided, as best shown in Figures 2 and 4 with the usual base such as that shown in U. S. Patent to Swan 774,404 Nov. 8, 1904, and consisting of a sheet metal shell 26 having at one end an annular glass plug or web 27 which carries the center contact 28 made in the form of a metal disc having a center hole. One of the leading-in wires 29, indicated by dotted lines in Figures 2 and 4, extends through and is soldered to the center contact 28, the other wire being bent around and under the edge of the shell 26, with its end soldered to the shell at that point.

In accordance with my invention, part of the shell 26 and the center contact 28 are electrically heated to the proper temperature by passing through them current when the base is in the soldering position. To do this I provide for the center contact 28 an electric heater comprising a pair of top electrodes 30 preferably of silver or some similar non-oxidizable metal mounted on heavy copper fingers 31 carried on springs 32 and electrically connected to heavy leads 33 proportioned to carry currents of high amperage but low voltage, such as 2 to 5 volts. The top electrodes are so mounted that as the lamp base is carried under them by the rotation of the spider 15 the center contact 28 of the base slides in under the top electrodes 30, which press upon it with sufficient force to make a good electrical contact, whereupon current flows from one top electrode to the other, and that portion of the center contact 28 between the top electrodes 30 is heated to permit the top soldering to be done. At the same time, the side soldering of the other lead wire to the shell 26 of the base is done by heating the shell 26 at the point and only at the point where the other lead wire is to be soldered to it by means of a similar electric heater comprising a pair of silver side electrodes 34 spaced apart a short distance and carried on copper fingers 35 mounted on the ends of flat springs 36 and connected to leads 37. The side electrodes are preferably movable so as to be brought into and out of contact with the shell of the base. I prefer to impart the necessary movement to the side electrodes by mounting them on a rock shaft 38 which is automatically moved at the proper time through links actuated from a cam 39 on the counter shaft 40 which is driven by a chain 41 from the drive shaft 11. When the side electrodes are brought into contact with the shell 27 of the base, as best shown in Fig. 5, current flows from one electrode to the other through only that particular portion of the shell which is between the electrodes producing a localized heating of the shell at that particular place or spot where the solder is to be applied to fasten the lead wire to the shell.

The current may be supplied to the electrodes in various ways, but I prefer to connect each pair of electrodes to a secondary winding 42 of a transformer having primary windings 43 supplied with alternating current through a circuit which is opened and closed at the proper intervals by some suitable switching mechanism automatically actuated, as for example, ring contacts 44 mounted on the drive shaft 11 and cooperating with brushes 45 to make and break the circuit through the primary windings 43. The circuit is manually controlled by a switch 46.

To apply the solder to the heated places or spots on the center contact and on the shell of the base I provide an automatic solder feeding mechanism, which in the particular machine shown is actuated from a cam 47 on the countershaft 40 through links and levers 48. That portion of the mechanism which delivers the solder to the center contact is a duplicate of that which delivers it to the side of the base and therefore only the side soldering mechanism will be described in detail.

This particular mechanism is constructed to use tubular solder wire 49 having a core of flux, or a wire having pockets containing flux, so that no separate mechanism for applying flux is neded. The solder wire 49 is carried on reel 50. For delivering the end of this wire to the side of the base there is slidably mounted in guides 51 on a pedestal on the table of the machine a reciprocating head 52 constructed to carry the end of the wire into contact with the base as the head advances from its rear position, shown in Figure 4, to the soldering position shown in Figure 2. The end of the solder wire is melted by contact with the hot base, and then the head retreats to the rear position shown in Figure 4, completing its cycle of movement.

To hold the solder wire with its end projecting so as to come into contact with the hot base there is provided on the head 52 some bosses or clamps 53 to hold a feed tube 54 having a tubular guide tip 55 with a bore slightly greater than the diameter of the solder wire for directing the projecting end of the solder wire to the precise spot where the solder is to be applied. The solder wire is free to move forward in the feed tube toward the guide tip but it cannot move backwards because of a locking pawl 56 mounted on the feed tube near the guide tip to seize and hold the solder wire against backward movement. The mechanism is so arranged that during the retreat of the head 52 the solder wire is automatically fed forward along the bore of the feed tube far enough to replace the projecting end which was melted off and applied to the base while the head was in the soldering position.

I prefer to arrange the mechanism so that the feeding of the solder wire is positive, and preferably occurs during the retreat of the head, so that by the time it reaches its rear position the proper length of solder wire is projecting from the guide tip 55 and the solder wire is locked by the pawl 56, ready for the forward movement of the head. In the particular form of mechanism shown, the parts are so arranged that during the final stages of the retreat of the head from the base which has just been soldered, the solder wire is fed forward positively until the length to be used on the next base projects from the end of the guide tube. To feed the proper length of solder wire forward through the feed tube there is mounted on the feed tube a floating or sliding sleeve 57 which carries gripping pawls 58 extending through slots in the feed tube. These gripping pawls grip the wire and move it forward through the feed tube with the sleeve 57 as the sleeve moves forward along the feed tube, but release the wire and slide over it as the sleeve 57 moves back along the feed tube under the thrust of a spring 59. To cause this forward movement of the sleeve 57, with the resultant positive feeding of the solder wire gripped by the gripping pawls 58 on the sleeve, I provide the sleeve actuating mechanism shown, in which collars 60 are threaded on the sleeve to be adjustable longitudinally of it and to cooperate with a tappet 61 slidably mounted in one of the bosses 53, guided by a stud 62 on the head, and urged by a spring 63 toward the right in Figure 2. To feed the solder wire positively and definitely along the feed tube I provide an adjustable stop 64 mounted on the frame 51 in position to be encountered by the tappet 61 near the end of the retreat of the head. When this occurs the tappet 61 and the sleeve 57 are held stationary while the head continues its retreat, so that the sleeve 57 is positively moved forward along the feed tube 53 into the position shown in Figure 4. The solder wire is held stationary by the sleeve 57 while the feed tube slides back along the wire as the head moves into its rear position, and the correct length of solder wire is projected from the end of the feed tube. The mechanism is now ready for the movement of the head forward to solder the next base, and during that movement the solder wire is locked to the feed tube by the locking pawl 56. During the forward movement of the head the first step toward replacing the end which will be melted off at the end of the forward movement of the head is taken by causing the sleeve 57 to slide back along the feed tube as far as it can go, until it is stopped by a shoulder on the feed tube. This backward slide of the sleeve along the feed tube carries the gripping pawls back along the solder wire a distance equal to the length of solder wire which will be fed forward. The length of solder wire measured off is controlled by adjusting the collars 60 to determine the travel of the sleeve 57 along the feed tube 53. The floating sleeve 57 is now against the shoulder of the feed tube, and when it is moved forward the gripping pawls will seize the solder wire and compel it to move in the feed tube with the sleeve 57. In order that this backward slide of the sleeve 57 shall occur only when there is a base in place to be soldered I make the spring 63 stronger than 59, so that the sleeve cannot slide back along the feed tube and measure off solder wire to be fed except while the spring 63 is so disabled that it cannot prevent the spring 59, sliding the sleeve 57 backward along the feed tube. To disable the spring 63 whenever a base is in soldering position, and thereby permit the mechanism to feed the solder wire enough to replace the end, which will be melted off in soldering that base, and so be ready for the next base, a trigger 65 is slidably mounted on the head 52 with its end in position to encounter a base in the basing socket 17, as the head advances toward the base. When the trigger encounters the base it is held stationary, and the continued advance of the head causes it to be pushed back against the spring 63 during the final stages of the advance of the head, thereby getting the tappet 61 out of the way of the collars 60 and leaving sleeve 57 free to slide back along the feed tube 53 under the push of the spring 59, and to prepare for positively feeding the solder wire forward. As long as there is no base in the socket the spring 63, through the tappet 61, holds the sleeve 57 motionless on the feed tube during the entire forward and back movements of the head, which reciprocates with the end of the solder wire projecting from the guide tip, and the solder wire is motionless in the feed tube until a base appears in a basing socket, whereupon the mechanism acts as above described.

Near the end of the backward movement of the head 52, as it approaches the position shown in Figure 4, the tappet 61 encounters the stop 63 and forces the sleeve along the feed tube into the position of Fig. 4, thereby pushing the end of the wire out of the feed tube a distance dependent upon the adjustment of the feed mechanism. The locking pawl 56 on the feed tube catches the wire as it is fed forward out of the feed tube, and carries it forward with the feed tube when the head 52 makes its forward movement so that whatever length of solder wire is projected from the end of the guide tip 55 by the forward movement of the sleeve 57 on the feed tube is held in that position and is applied to the base.

The mechanism is so timed that after the center contact and the shell of the base have been in engagement with the top and side electrodes long enough to be heated to the proper temperature, the solder wire feeding mechanism is actuated to feed both solder wires and bring their ends into contact with the hot spots on the base, whereupon the solder melts and solders both lead wires to the base.

As the solder feeding device on each head 52 brings the end of the solder wire to the base the tip of the trigger 65 encounters the base and exerts a pressure on it. This pressure from the side soldering device cannot displace the base sidewise because it is held by the basing socket, and the pressure from the center contact soldering device is resisted by the spring 23, which is strong enough to hold the lamp with its base in the socket during the soldering.

To cut off the portions of the lead wires which project beyond the center contact and the side contact, I may use an automatic wire cutter 66 which consists essentially of wire cutting pinchers mounted in position to cut off the top wire flush with the center contact and to bend the end of the other up and around the edge of the shell of the base, and then cut it off. These cutting pliers may be automatically actuated from the drive shaft 11 in various ways, as for instance, by a pneumatic motor 67 controlled by the drive shaft.

The lamp with the base to which the lead wires have been soldered is a completed lamp and may, to advantage, be flashed or aged while still in the basing machine. To this end I may provide flashing brushes 68 mounted on an insulating block 69 at the positions immediately succeeding the soldering position in which to engage the center of the lamp. These flashing brushes form one terminal of a circuit, the other terminal of which is connected to the frame of the machine, in any suitable way, for example, through a brush 70, and as the bases are in metallic contact with the basing sockets current can flow from the center contact through the filament to the shell of the base and thence through the frame of the machine back to the source. Suitable resistances 71 connected in series with the flashing brushes 68 permit the application of currents of differing amounts at the different positions so that any desired aging or flashing schedule can be followed.

While I have shown my invention embodied in an automatic machine for soldering the leading-in wires to the bases of incandescent lamps and similar devices, it is of general application and may be used to advantage for any kind of soldering where a definite and comparatively small amount of solder is to be applied very accurately at a definite place on a metal plate or object. The solder feeding mechanism may be used to advantage on a machine in which the object to be soldered is heated in other ways than by the mechanism I have shown, and the mechanism for electrically heating a local area of the object to be soldered is of general utility and application, regardless of the particular solder feeding mechanism used. Various modifications and changes may be made in the mechanism shown and therefore I do not limit my invention to the particular embodiment shown, but intend to cover all changes and modifications within the spirit and scope of the appended claims.

What I claim as new and desire to secure by Letters Patent of the United States is:—

1. In a soldering machine, the combination of a movable work holder, a pair of electrodes mounted adjacent the path of said holder to make electrical contact with an object in said holder, actuating mechanism for bringing said electrodes and said holder into and out of operative relation to each other, and a solder feed device actuated by said mechanism to place solder in contact with the portion of said object heated by flow of current through it from one electrode to the other.

2. In a soldering machine, the combination of a work holder, a pair of electrodes mounted side by side and bodily movable with reference to said holder to come into and out of contact with adjacent points on an object in said holder, a solder feed device for placing solder in contact with an object in said holder, and a common actuating means for moving said holder and said electrodes into and out of operative relation to each other and for actuating said solder feed device while said electrodes and said holder are in operative relation.

3. In a soldering machine, the combination of a bodily movable work holder, a pair of resiliently mounted electrodes adjacent the path of said holder, a solder feed device adjacent said electrodes to feed solder toward said holder when actuated, and actuating mechanism for moving said holder to bring an object in said holder into and out of operative contact with said electrodes and for actuating said solder feed device while the object in said holder is in operative contact with said electrodes.

4. In a soldering machine, the combination of a pair of resiliently mounted electrodes adjacent each other, a bodily movable work holder mounted to travel in a path which causes an object in said holder to encounter both said electrodes, a solder feed device adjacent said electrodes for feeding solder toward said holder when actuated, and actuating mechanism for bodily moving said holder to carry said object under said electrodes and within range of said solder feed device and thereby bring said electrodes into conducting relation with said object at two adjacent points to pass current through that portion of the object between said points and for actuating said solder feed device to place solder in contact with said object between said points.

5. In a soldering machine, the combination of a movable work holder, a pair of electrodes resiliently mounted adjacent the path of said holder to be bodily movable into engagement with an object in said holder at adjacent points on said object, a solder feeding device for bringing solder into contact with the object in said holder at a place heated by the flow of current through the object from one electrode to the other, and common actuating means for moving said holder and said electrodes and for actuating said solder feeding device while said place on said object is hot enough to melt the solder.

6. In a soldering machine, the combination of an intermittently and bodily movable work holder, a pair of resilient electrodes mounted side by side and adjacent the path of said holder to be simultaneously movable toward and away from said path, a solder feed device for delivering solder between said electrodes, and common actuating mechanism for moving said holder into operative relation to said electrodes and simultaneously moving said electrodes into and out of operative relation to an object in said holder and actuating said solder feed device while said holder is stationary.

7. In a soldering machine, the combination of a rotatable carrier having a plurality of work holders concentrically arranged about the axis of said carrier, a pair of electrodes mounted adjacent the path of said holders and bodily movable transversely of the path of said work holders to engage an object in any of said holders, a solder feed device adjacent said electrodes for feeding solder into contact with an object engaged by said electrodes, and common actuating means for moving said carrier intermittently to bring each holder in succession into operative relation to said electrodes and for simultaneously bringing said electrodes into conducting contact with the object in said holder at adjacent points on said object and actuating said solder feed device while the holder is stationary.

8. In a soldering machine, the combination of a plurality of holders mounted to move intermittently in a circular path, a pair of electrodes mounted adjacent the path of said holders and bodily movable radially of said path, a solder feeding device mounted adjacent said electrodes to deliver solder at a point between said electrodes, and common actuating mechanism for bringing each holder in succession into operative relation to said electrodes and for then, while said holder is stationary, moving said electrodes into engagement with the object in said holder and simultaneously actuating the solder feeding device to bring solder into contact with the heated portion of the object between said electrodes.

9. In a machine of the character described, the combination of a rotatable carrier having a holder for an incandescent lamp, soldering mechanism adjacent the path of said holder for heating the base of a lamp in said holder and applying solder to the heated place on said base, common actuating mechanism for actuating said carrier and said soldering mechanism to bring said holder into operative relation to said soldering mechanism, and means mounted adjacent the path of said holder and beyond said soldering mechanism for passing current through the lamp with the soldered base.

10. In a machine of the character described, the combination of a movable holder for an incandescent lamp, heating means mounted adjacent the path of said holder to heat on the base of said lamp a restricted area adjacent the end of a leading-in wire, a solder feeding device for bringing solder into contact with the heated place on said base, common actuating mechanism for bringing said holder into operative relation to said heating means and said solder feeding device, and then actuating said solder feeding device while the place on the base is hot to solder the end of the leading-in wire to the base, and electrical connections comprising a brush mounted in position to engage the center contact of each lamp as it moves away from said soldering device whereby current is passed through the filament of the lamp while in said holder.

11. In a soldering machine, the combination of a work holder, a pair of electrodes mounted to make electrical contact at adjacent points of an object in said holder and heat a restricted area on said object, a solder feed device comprising a feed tube mounted to move toward and away from said solder, feeding mechanism for moving a holder wire in said tube to cause the end of the wire to project from said feed tube, and actuating means for moving said feed tube to bring the projecting end of the solder wire into contact with the object in said holder.

12. In a soldering machine, the combination of a work holder, means for heating a restricted area on an object in said holder, a solder feeding device for feeding the end of a solder wire against the heated place on said object comprising a reciprocating feed tube, wire feeding mechanism actuated by the retreat of said tube to positively advance the solder wire along the bore of the tube a distance independent of the travel of said tube, and means for locking the solder wire to said tube during the advance of the tube toward the holder.

13. A solder wire feeding device comprising a reciprocating feed tube for the wire, a locking pawl for preventing backward movement of said wire on said tube, a feeding pawl slidably mounted on said feed tube to seize said solder wire, means operative during the advance of the tube for moving said feeding pawl backwardly along said feed tube to its initial position, and means responsive to the backward movement of said feed tube for positively sliding said feeding pawl forward along the feed tube a distance variable at will and independent of the travel of the tube and thereby positively feeding the solder wire forward in the tube.

14. In a solder feeding device, the combination of a reciprocating feed tube for a solder wire, a locking pawl for locking the wire to the feed tube at a point near the tip of the tube, positive wire feeding mechanism comprising a sleeve slidably mounted on said feed tube to reciprocate longitudinally thereof and provided with pawls for gripping the solder wire, an adjustable stop mounted in the path of movement of said sleeve to hold the sleeve stationary during a portion of the rearward movement of said head and thereby move said sleeve along the feed tube and positively advance the solder wire in the tube, and means for returning said sleeve to the initial position on said feed tube during the advance of said tube.

15. A solder feeding device comprising a feed tube mounted to reciprocate and having near the tip a pawl for locking the solder wire immovable in said tube with its end projecting, and feeding mechanism for feeding the solder wire longitudinally of the tube comprising a sleeve slidably mounted on said tube and provided with pawls for gripping said solder wire when the sleeve is moved toward the tip of the tube, a spring for urging said sleeve away from the tip of the tube, a tappet for engaging said sleeve to move it positively along said feed tube towards the tip thereof and thereby feed the solder wire along the tube, and an adjustable stop in the path of said tappet for producing relative movement between said feed tube and said tappet to positively move said sleeve and feed the wire.

16. In a soldering machine, the combination of a work holder, means for heating an object in said holder, a solder feeding device comprising a reciprocating head having a feed tube for solder wire, a locking pawl for holding the solder wire immovable in said feed tube, a feeding pawl mounted on said feed tube to reciprocate longitudinally thereof, a spring for holding said feeding pawl in its initial position, an adjustable stop for engaging and positively moving said feeding pawl out of its initial position toward the tip of the feed tube during the backward movement of said tube to an extent independent of the extent of said movement, restraining means for preventing the return of said feeding pawl to its initial position by said spring, and a trigger mounted on said head in position to engage the object in said holder during the forward movement of said feed tube and thereby disable said restraining means to permit said feeding pawl to move backward along the feed tube to its initial position and thereby engage the solder wire so as to feed it forward on the next backward movement of the feed tube.

17. In a soldering machine, the combination of a work holder, a pair of electrodes resiliently mounted adjacent said holder to be bodily movable into engagement with an object in said holder at adjacent points on said object, a solder feeding device for bringing solder into contact with the object in said holder at a place heated by the flow of current through the object from one electrode to the other, and common actuating means for moving said electrodes into engagement with an object in said holder and for actuating said solder feeding device while said place on said object is hot enough to melt the solder.

18. A soldering machine comprising a holder for holding a bulb and a base with a metal shell fastened on said bulb, a soldering device associated with said holder and comprising electrical heating means for developing heat electrically in said metal shell in said holder and a solder feed device for feeding solder into contact with said metal shell, said holder and said soldering device being relatively movably into and out of operative relation, and actuating means for bringing said soldering device and the base in said holder into operative relation and operating said solder feed device to feed solder into contact with the heated metal of the base in said holder.

19. A soldering machine comprising a holder for holding a metal article, contacts associated with said holder to engage said article at different points, a source of current connected to said contacts to heat the portion of the article between said points, a solder feed device mounted adjacent said holder for feeding solder into contact with said article between said points, and actuating means for bringing said contacts and the article in said holder into engagement and operating said solder feed device to feed solder into contact with the heated portion of the article in said holder.

20. A soldering machine comprising a movable holder for holding a metal article, contacts associated with said holder to engage said article at different points, a source of current connected to said contacts to heat said article, a solder feed device mounted adjacent the path of said holder for feeding solder into contact with the heated metal of said article, and actuating means for bringing said holder into registry with said solder feed device and operating said device to feed solder into contact with the heated metal of the article in said holder.

21. A soldering machine comprising a holder for holding a metal article, means cooperating with said holder for locally heating electrically a portion of the metal of said article, a solder feed device mounted adjacent said holder for feeding solder toward said holder and into contact with the heated metal of said article, and actuating means for bringing said holder and said soldering device into operative relation and operating said device to feed solder into contact with the heated metal of the article in said holder.

22. A soldering machine comprising a movable holder for holding a bulb and a metal base fastened on said bulb, means associated with said holder to develop heat electrically in said base, a solder feed device mounted adjacent the path of said holder for feeding solder into contact with the heated metal of said base, and actuating means for bringing said holder into registry with said solder feed device and operating said device to feed solder into contact with the heated metal of the base in said holder.

23. A soldering machine comprising a holder for holding a metal article, means associated with said holder to develop heat electrically in the metal of said article, a solder feed device mounted adjacent said holder for feeding solder toward said holder and into contact with the heated metal of said article, and actuating means for bringing said holder and said solder feed device into operative relation and operating said device to feed solder into contact with the heated metal of the article in said holder.

In witness whereof, I have hereunto set my hand this 26th day of March, 1925.

DANIEL K. WRIGHT.